(12) United States Patent
Olson

(10) Patent No.: US 12,539,169 B2
(45) Date of Patent: Feb. 3, 2026

(54) ELECTRODE BASKET HAVING HIGH-DENSITY CIRCUMFERENTIAL BAND OF ELECTRODES

(71) Applicant: St. Jude Medical, Cardiology Division, Inc., St. Paul, MN (US)

(72) Inventor: Eric Olson, St. Paul, MN (US)

(73) Assignee: St. Jude Medical, Cardiology Division, Inc., St. Paul, MN (US)

( * ) Notice: Subject to any disclaimer, the term of this patent is extended or adjusted under 35 U.S.C. 154(b) by 1087 days.

(21) Appl. No.: 17/596,445

(22) PCT Filed: Jun. 5, 2020

(86) PCT No.: PCT/US2020/036410
§ 371 (c)(1),
(2) Date: Dec. 10, 2021

(87) PCT Pub. No.: WO2020/251857
PCT Pub. Date: Dec. 17, 2020

(65) Prior Publication Data
US 2022/0304745 A1    Sep. 29, 2022

Related U.S. Application Data

(60) Provisional application No. 62/861,135, filed on Jun. 13, 2019.

(51) Int. Cl.
*A61B 18/14*    (2006.01)
*A61B 18/00*    (2006.01)

(52) U.S. Cl.
CPC ............ *A61B 18/1492* (2013.01); *A61B 2018/00267* (2013.01); *A61B 2018/00577* (2013.01)

(58) Field of Classification Search
CPC ........................... A61B 2018/00267
See application file for complete search history.

(56) References Cited

U.S. PATENT DOCUMENTS

| 10,470,682 B2 | 11/2019 | Deno et al. |
| 2012/0143298 A1* | 6/2012 | Just .................... A61B 18/1492 607/122 |

(Continued)

FOREIGN PATENT DOCUMENTS

| EP | 2805683 A3 | 3/2015 |
| WO | 2017156039 A1 | 9/2017 |
| WO | 2018201037 A1 | 11/2018 |

OTHER PUBLICATIONS

International Search Report and Written Opinion, PCT/US2020/036410, Dec. 17, 2020, 11 pages.

*Primary Examiner* — Ronald Hupczey, Jr.
(74) *Attorney, Agent, or Firm* — Kilpatrick Townsend & Stockton LLP

(57) ABSTRACT

Described herein is an electrode basket for a catheter system. The electrode basket includes a proximal end and a distal end. A longitudinal axis of the electrode basket extends longitudinally through the proximal end and the distal end. The electrode basket also includes a plurality of splines extending from the proximal end to the distal end, each spline including a proximal portion extending at least partially longitudinally from the proximal end, a distal portion extending at least partially longitudinally from the distal end, a highly pitched region, and a plurality of electrodes. The highly pitched region is oriented more circumferentially than the proximal portion and the distal portion. Each of the plurality of electrodes is located within the highly pitched region such that a high-density circumferential band of electrodes is defined around the electrode basket.

20 Claims, 10 Drawing Sheets

(56) References Cited

U.S. PATENT DOCUMENTS

| | | |
|---|---|---|
| 2013/0137963 A1 | 5/2013 | Olson |
| 2014/0257069 A1* | 9/2014 | Eliason .................... A61B 5/24 |
| | | 600/373 |
| 2014/0378966 A1 | 12/2014 | Haverkost et al. |
| 2017/0042449 A1* | 2/2017 | Deno ..................... A61B 5/341 |
| 2017/0224415 A1* | 8/2017 | Dong ................. A61B 18/1492 |
| 2018/0192959 A1 | 7/2018 | Mou et al. |

* cited by examiner

ELECTRODE BASKET HAVING HIGH-DENSITY CIRCUMFERENTIAL BAND OF ELECTRODES

CROSS-REFERENCE TO RELATED APPLICATIONS

This application is a national stage entry of PCT/US2020/036410, filed Jun. 5, 2020, which claims priority to U.S. provisional patent application Ser. No. 62/861,135, filed Jun. 13, 2019, the disclosures of which are incorporated herein by reference in their entirety.

FIELD OF THE DISCLOSURE

The present disclosure relates generally to medical devices that are used in the human body. In particular, the present disclosure relates to an electrode basket including a plurality of splines with a non-constant curvature including a highly pitched region to reduce an inter-electrode spacing between adjacent splines.

BACKGROUND

Electrophysiology catheters are used in a variety of diagnostic, therapeutic, and/or mapping and ablative procedures to diagnose and/or correct conditions such as atrial arrhythmias, including for example, ectopic atrial tachycardia, atrial fibrillation, and atrial flutter.

Typically, to perform such diagnostic, therapeutic, and/or mapping and ablative procedures, a catheter is deployed and manipulated through a patient's vasculature to an intended site, for example, a site within a patient's heart. The catheter typically carries one or more electrodes that can be used for cardiac mapping or diagnosis, ablation, and/or other therapy delivery modes, or both, for example. In some cases, a spiral catheter may be used to map the target site or to perform the ablation procedure. Spiral catheters can have precisely distributed electrodes therealong, based on the desired medical procedure. For example, spiral catheters can have electrodes distributed with specific spacing that may be desirable to map the target site. As another example, spiral catheters may have uniformly distributed electrodes, which is useful for ablation in the pulmonary veins, where it is desirable to create a contiguous circumferential ablation lesion set. Pulmonary veins, however, are not circular in shape; therefore, a spiral catheter may not fit properly in the antrum or atrium of the vein. For example, the spiral catheter may "cant" to one side or another such that the axis of the spiral or hoop is no longer along the same axis as the central axis of the vein. In such cases, proper location of the electrodes (e.g., to accurately map the pulmonary vein or feature thereof, or to form a contiguous lesion in the target location) can be difficult. Moreover, the spiral catheter is necessarily attached only at one point (e.g., at a proximal end thereof), which results in positioning force only being applied on one side of the spiral. Thus, force cannot be applied on the opposite side (e.g., 180° around the spiral).

In other cases, a basket catheter may be used. Basket catheters are approximately spherical/ellipsoidal in shape, and therefore may tend to maintain alignment with the central axis of the veins. That is, basket catheters may be less likely to cant within a vein. However, electrode placement on basket catheters is limited by the number of splines in the electrode basket, and electrode density around latitudinal lines may be low. For spiral catheters, it is relatively easy to achieve upwards of 16 electrodes around a latitudinal circumference. This electrode density is more difficult to achieve for basket catheters, as they are often limited to 8 splines (45-degree angular density) due to inherent difficulties in increasing the number of splines. For example, as a number of splines increases, the diameter of the electrode basket increases, which is not desirable as larger electrodes baskets may be more difficult to deploy in smaller target locations. Alternatively, narrower splines can be used to maintain the diameter of the electrode basket, but narrower splines limit electrode size. Smaller electrodes may be less desirable for ablation and electroporation, as smaller electrodes generate smaller, more lossy fields.

For a basket catheter, it would be relatively easy to create an electrode spacing of 1, 2, or 4 mm spacing along a spline, but to create such a small inter-electrode spacing between electrodes on adjacent splines is difficult, especially near the lateral midline of the electrode basket, where the splines are furthest from one another. The electrode spacing between splines near the midline is:

$$\text{spacing} = \pi D/n, \text{ where } n \text{ is the number of splines}$$

By way of an example, for a basket catheter with a standard diameter of 27 mm and having 8 splines, the electrode spacing would be about 10.6 mm. For either unipolar or bipolar-based ablation or electroporation, this electrode spacing may preclude a continuous lesion. To achieve the desired electrode spacing of 4 mm (e.g., for ablation procedures), the electrode basket diameter would be about 1.02 cm, which would be difficult to construct in practice and may be too small to be used effectively in certain anatomical structures. Alternatively, the number of splines may be increased to 16 (e.g., to achieve higher electrode density), but such an electrode basket is also difficult to construct. Such challenges are exacerbated for even smaller electrode spacing, such as that desired for mapping procedures (e.g., about 2 mm or less).

Accordingly, a need exists for an electrode basket that facilitates increasing the latitudinal or circumferential electrode density of the electrode basket.

BRIEF SUMMARY OF THE DISCLOSURE

The present disclosure generally relates to electrode baskets having a plurality of splines with a highly pitched region that decreases the space between adjacent splines and, therefore, decreases the spacing between electrodes on adjacent splines, without increasing the number of splines of the electrode basket. The highly pitched region of each spline is "pitched" with respect to a longitudinal axis, or is oriented more circumferentially than adjacent regions. Positioning the electrodes within this highly pitched region enables a decrease in the inter-electrode spacing, which is desirable in both mapping and ablation procedures. The disclosed electrode basket may therefore achieve desired electrode density previously unavailable in basket catheters, while avoiding the above-described disadvantages of spiral catheters. That is, the electrode basket is less likely to "cant" within a patient's vasculature.

In one embodiment, the present disclosure is directed to an electrode basket for a catheter system. The electrode basket includes a proximal end and a distal end. A longitudinal axis of the electrode basket extends longitudinally through the proximal end and the distal end. The electrode basket also includes a plurality of splines extending from the proximal end to the distal end, each spline including a proximal portion extending at least partially longitudinally from the proximal end, a distal portion extending at least partially longitudinally from the distal end, a highly pitched region extending between the proximal portion and the distal portion, and a plurality of electrodes. The highly pitched region is oriented more circumferentially than the proximal portion and the distal portion. Each of the plurality of electrodes is located within the highly pitched region such that a high-density circumferential band of electrodes is defined around the electrode basket.

In another embodiment, the present disclosure is directed to a catheter system including a flexible catheter shaft, a handle coupled to a proximal end of the catheter shaft, and an electrode basket sized for advancement through the catheter shaft to a distal end of the catheter shaft. The electrode basket includes a proximal end and a distal end. A longitudinal axis of the electrode basket extends longitudinally through the proximal end and the distal end. The electrode basket also includes a plurality of splines extending from the proximal end to the distal end, each spline including a proximal portion extending at least partially longitudinally from the proximal end, a distal portion extending at least partially longitudinally from the distal end, a highly pitched region extending between the proximal portion and the distal portion, and a plurality of electrodes. The highly pitched region is oriented more circumferentially than the proximal portion and the distal portion. Each of the plurality of electrodes is located within the highly pitched region such that a high-density circumferential band of electrodes is defined around the electrode basket. The catheter system further includes a power supply electrically coupled to the electrode basket and configured to energize each of the plurality of electrodes of each spline.

In another embodiment, the present disclosure is directed to a method of performing a medical procedure at a target location. The method includes providing an electrode basket at a distal end of a catheter shaft. The electrode basket includes a plurality of splines extending from a proximal end to a distal end of the electrode basket. Each spline includes a proximal portion extending at least partially longitudinally from the proximal end, a distal portion extending at least partially longitudinally from the distal end, a highly pitched region extending between the proximal portion and the distal portion, and a plurality of electrodes, wherein the highly pitched region is oriented more circumferentially than the proximal portion and the distal portion. Each of the plurality of electrodes is located within the highly pitched region. The method also include configuring the electrode basket in a collapsed configuration for delivery to the target location, advancing the electrode basket to the target location using the catheter shaft, and deploying the electrode basket to an expanded configuration at the target location, wherein, in the expanded configuration, the plurality of electrodes of each spline of the plurality of splines cooperatively defines a high-density circumferential band of electrodes around the electrode basket. The method further includes at least one of: (i) energizing the electrode basket to perform the medical procedure; and (ii) determining relative locations of the plurality of electrodes on each spline within an electrical field generated across the target location to perform the medical procedure.

The foregoing and other aspects, features, details, utilities and advantages of the present disclosure will be apparent from reading the following description and claims, and from reviewing the accompanying drawings.

BRIEF DESCRIPTION OF THE DRAWINGS

Corresponding reference characters indicate corresponding parts throughout the several views of the drawings. It is understood that the Figures are not necessarily to scale.

DETAILED DESCRIPTION OF THE DISCLOSURE

The present disclosure provides medical devices including electrode baskets for catheter systems, for use in the human vasculature for medical procedures such as mapping and/or ablation procedures, as well as methods of utilizing the same. Electrode baskets of the present disclosure include a plurality of splines, each spline having a highly pitched region and including a plurality of electrodes. The highly pitched region of each spline has a more circumferential orientation than adjacent regions of the corresponding spline. The disclosed embodiments enable electrodes formed on adjacent splines to define closest electrode pairs with a reduced inter-electrode spacing. That is, the electrode baskets of the present disclosure overcome known issues with electrode density on splines with standard, constant curvature by enabling electrodes on adjacent splines to be nearer one another. Such an electrode arrangement improves electrode density about the circumference of the electrode basket, which can improve the precision of mapping and/or ablation procedures and, therefore, lead to more consistent and improved patient outcomes.

Figure 1:
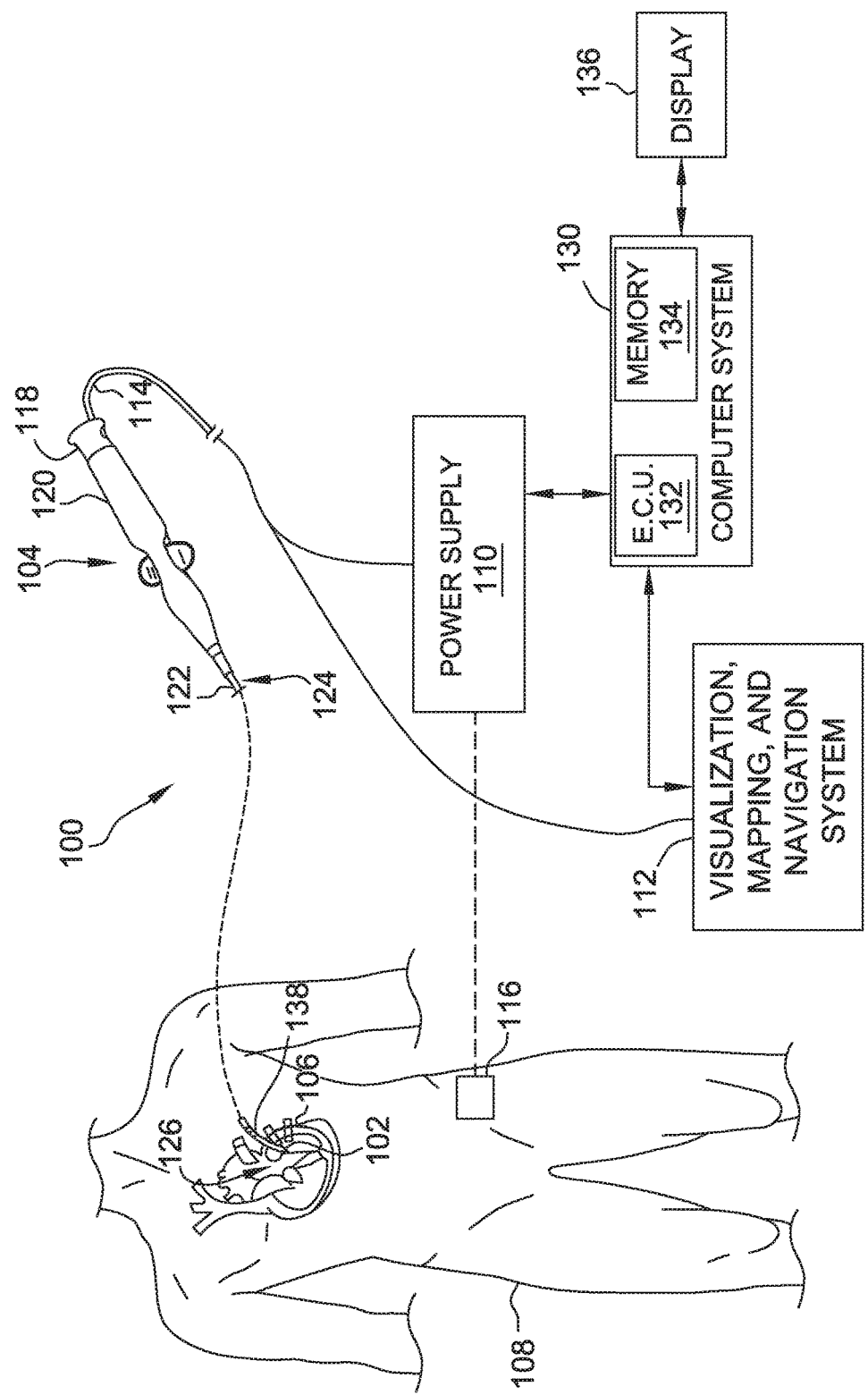
FIG. 1 is a schematic and block diagram view of a catheter system incorporating various embodiments of the present disclosure.

Referring now to the drawings, FIG. 1 is a diagrammatic and block diagram view of a catheter system 100 for diagnostic purposes, anatomical mapping, electroporation therapy, and/or ablation therapy. In general, the various embodiments include an electrode assembly disposed at the distal end of a catheter shaft. As used herein, "proximal" refers to a direction toward the end of the catheter near the clinician and "distal" refers to a direction away from the clinician and (generally) inside the body of an individual.

System 100 includes a catheter electrode basket 102 including at least one catheter electrode configured to be used as described below. Electrode basket 102 is incorporated as part of a medical device such as a catheter 104 for electroporation therapy, diagnostic, mapping, and/or therapeutic procedures. For example, electrode basket 102 may be used for mapping one or more structures 106 within a patient's body 108, also referred to herein as internal body structures 106. As another example, electrode basket 102 may be used for ablation therapy or electroporation therapy of tissue of structures 106 in body 108. In the illustrated embodiment, structure 106 includes a patient's vasculature and/or heart or cardiac tissue. It should be understood, however, that embodiments may be used to conduct mapping, diagnosis, and/or ablation or electroporation therapy with respect to a variety of other body structures and/or tissues.

System 100 also includes additional sub-systems, such as a power supply 110 and a visualization, navigation, and mapping system 112 for visualization, mapping and navigation of internal body structures 106. Power supply 110 is any power supply configured to energize or excite electrodes of electrode basket 102 and/or generate an electrical and/or magnetic field to perform a suitable function during a medical procedure. For example, power supply 110 includes radiofrequency (RF) ablation and/or electroporation generators to allow system 100 to be used for RF ablation and electroporation procedures. In such embodiments, power supply 110 is configured to energize the electrodes in accordance with an ablation or electroporation energization strategy, which may be predetermined or may be user-selectable. When used for ablation procedures, power supply 110 outputs radio frequency (RF) energy to catheter 104 through a cable 114. The RF energy leaves catheter 104 through electrodes of electrode basket 102 (e.g., using bi-polar electrode stimulation). The dissipation of the RF energy in the body increases the temperature near the electrodes, thereby permitting ablation to occur.

In some embodiments, system 100 includes one or more return electrodes 116 (e.g., patch electrodes, for mono-polar electrode stimulation or to perform mapping functions, as described further herein. In such embodiments, power supply 110 includes a signal generator coupled to patch electrodes 116 and configured to excited patch electrode 116 to generate an electrical field within body 108.

In the illustrated embodiment, catheter 104 includes a cable connector or interface 118, a handle 120, and a shaft 122 having a proximal end 124 and a distal end 126. Catheter 104 may also include other conventional components not illustrated herein such as one or more sensors (e.g., sensors 138), additional electrodes, and corresponding conductors or leads. Connector 118 provides mechanical and electrical connection(s) for cable 114 extending from power supply 110 and/or visualization, navigation, and mapping system 112, and as shown is disposed at the proximal end of catheter 104.

Handle 120 provides a location for the clinician to hold catheter 104 and may further provide means for steering or guiding shaft 122 within body 108. For example, handle 120 may include means to change the length of one or more guidewires extending through catheter 104 to distal end 126 of shaft 122 or other means to steer shaft 122. Moreover, in some embodiments, handle 120 may be configured to vary the shape, size, and/or orientation of a portion of catheter 104. Handle 120 is also conventional in the art, and it will be understood that the construction of handle 120 may vary. In an alternative exemplary embodiment, catheter 104 may be robotically driven or controlled. Accordingly, rather than a clinician manipulating a handle to advance/retract and/or steer or guide catheter 104 (and shaft 122 thereof in particular), a robot is used to manipulate catheter 104.

Shaft 122 is an elongated, tubular, flexible member configured for movement within body 108. Shaft 122 is configured to support electrode basket 102 as well as contain associated conductors, and possibly additional electronics used for signal processing or conditioning. Shaft 122 may also permit transport, delivery and/or removal of fluids (including irrigation fluids and bodily fluids), medicines, and/or surgical tools or instruments. Shaft 122 may be made from conventional materials such as polyurethane and defines one or more lumens configured to house and/or transport electrical conductors, fluids, or surgical tools. Shaft 122 may be introduced into a blood vessel or other structure 106 within body 108 through a conventional introducer. Shaft 122 may then be advanced, retracted, and/or steered or guided through body 108 to a desired location within structure 106, including through the use of guidewires or other means known in the art.

In embodiments of the present disclosure, electrode basket 102 is coupled to distal end 126 of shaft 122 for delivery of electrode basket 102 to a target location within the patient's body 108. Electrode basket 102 is selectively configurable between a collapsed configuration and an expanded configuration. For example, electrode basket 102 is delivered to the target location in the collapsed configuration (e.g., within catheter shaft 122 and/or within a separate guide tube, not specifically shown). Electrode basket 102 is then deployed in the expanded configuration at the target location to perform a medical procedure (e.g., an ablation or mapping procedure). Electrode basket 102 is subsequently energized using power supply 110 to perform the medical procedure at the target location. Electrode basket 102 may include a plurality of electrodes (e.g., electrodes 226, shown in FIGS. 3-5) thereon. Electrode basket 102 and/or catheter shaft 122 may include one or more sensors 138 therein or thereon.

Sensors 138 mounted in or on shaft 122 and/or in or on electrode basket 102 may be provided for a variety of diagnostic and therapeutic purposes including, for example, electrophysiological studies and cardiac mapping. In an exemplary embodiment, one or more of the sensors 138 are provided to perform a position sensing function. More particularly, and as will be described in greater detail below, one or more of the sensors 138 are configured to be positioning sensors that provide information to, for example, the visualization, navigation, and mapping system 112 relating to the location (e.g., position and orientation) of the catheter 104, and the distal end 126 thereof, in particular, at certain points in time. Sensors 138 may comprise one of a number of types of sensors, such as, for example and without limitation, electrodes (e.g., tip electrodes and ring electrodes) or magnetic sensors (e.g., magnetic coils). It will be appreciated that while only certain embodiments of catheter 104 and/or electrode basket 102 having particular numbers and types of sensors mounted therein or thereon are described in detail herein, the number, shape, orientation, and purpose of the sensors may vary.

Visualization, navigation, and mapping system 112 may be provided for visualization, mapping and navigation of internal body structures 106, for example, by determining the position of electrode basket 102 and/or specific electrodes thereon. These positions may be projected onto a geometrical anatomical model. Visualization, navigation, and mapping system 112 may include a conventional apparatus known generally in the art (e.g., an EnSite™ Velocity™ or EnSite Precision™ cardiac mapping and visualization system of Abbott Laboratories, or an EnSite NAVX™ System, commercially available from Abbott Laboratories and as generally shown with reference to commonly assigned U.S. Pat. No. 7,263,397 titled "Method and Apparatus for Catheter Navigation and Location and Mapping in the Heart," the entire disclosure of which is incorporated herein by reference). In various embodiments, visualization, navigation, and mapping system 112 uses the electrodes of electrode basket 102 as bipolar pairs for visualization, mapping, and navigation of internal body structures 106. It should be understood, however, that this system is exemplary only and not limiting in nature. Other technologies for visualizing/navigating/mapping a catheter in space are known, including for example, the CARTO™ navigation and location system of Biosense Webster, Inc., the AURORA™ system of Northern Digital Inc., commonly available fluoroscopy systems, or a magnetic location system such as the gMPS system from Mediguide Ltd. In this regard, some of the localization, navigation, and/or visualization system would provide a sensor for producing signals indicative of catheter location information, and may include, for example, one or more electrodes in the case of an impedance-based localization system, or alternatively, one or more coils (i.e., wire windings) configured to detect one or more characteristics of a magnetic field, for example, in the case of a magnetic-field based localization system.

System 100 may further include a main computer system 130, which may be integrated with visualization, navigation, and mapping system 112 in certain embodiments. Computer system 130 may include an electronic control unit (ECU) 132 and a memory 134. Computer system 130 further includes a display device 136, which may be integral to computer system 130 and/or coupled thereto. Catheter 104, and therefore electrode basket 102, may be coupled to computer system 130 and/or visualization, navigation, and mapping system 112 with a wired or wireless connection.

In one embodiment, as briefly described above, catheter 104 includes one or more positioning sensors 138 for producing signals indicative of catheter position and/or orientation information. As will be described in greater detail below, the position and orientation of catheter 104, and sensors 138 thereof, in particular, may be used in the generation of, for example, surface models of anatomic structures, as well as various types of maps, such as, for example, electrophysiological (EP) maps, tissue morphology maps, and the like. In an embodiment wherein visualization, navigation, and mapping system 112 is an electric field-based system, positioning sensor(s) 138 may include one or more electrodes mounted in or on shaft 122 of catheter 104. Alternatively, in an embodiment wherein visualization, navigation, and mapping system 112 is a magnetic field-based system, positioning sensor(s) 138 may include one or more magnetic sensors configured to detect one or more characteristics of a low-strength magnetic field. For instance, the magnetic sensors may comprise magnetic coils.

For purposes of clarity and illustration, visualization, navigation, and mapping system 112 will hereinafter be described as comprising an electric field-based system, such as, for example, the EnSite NavX™ system identified above. Accordingly, it will be appreciated that while the description below is primarily directed to an embodiment wherein positioning sensor(s) 138 include one or more positioning electrodes, it should be understood that visualization, navigation, and mapping systems that include positioning sensors other than the electrodes 116 described below, or electrodes in general, remain within the spirit and scope of the present disclosure.

Figure 2:
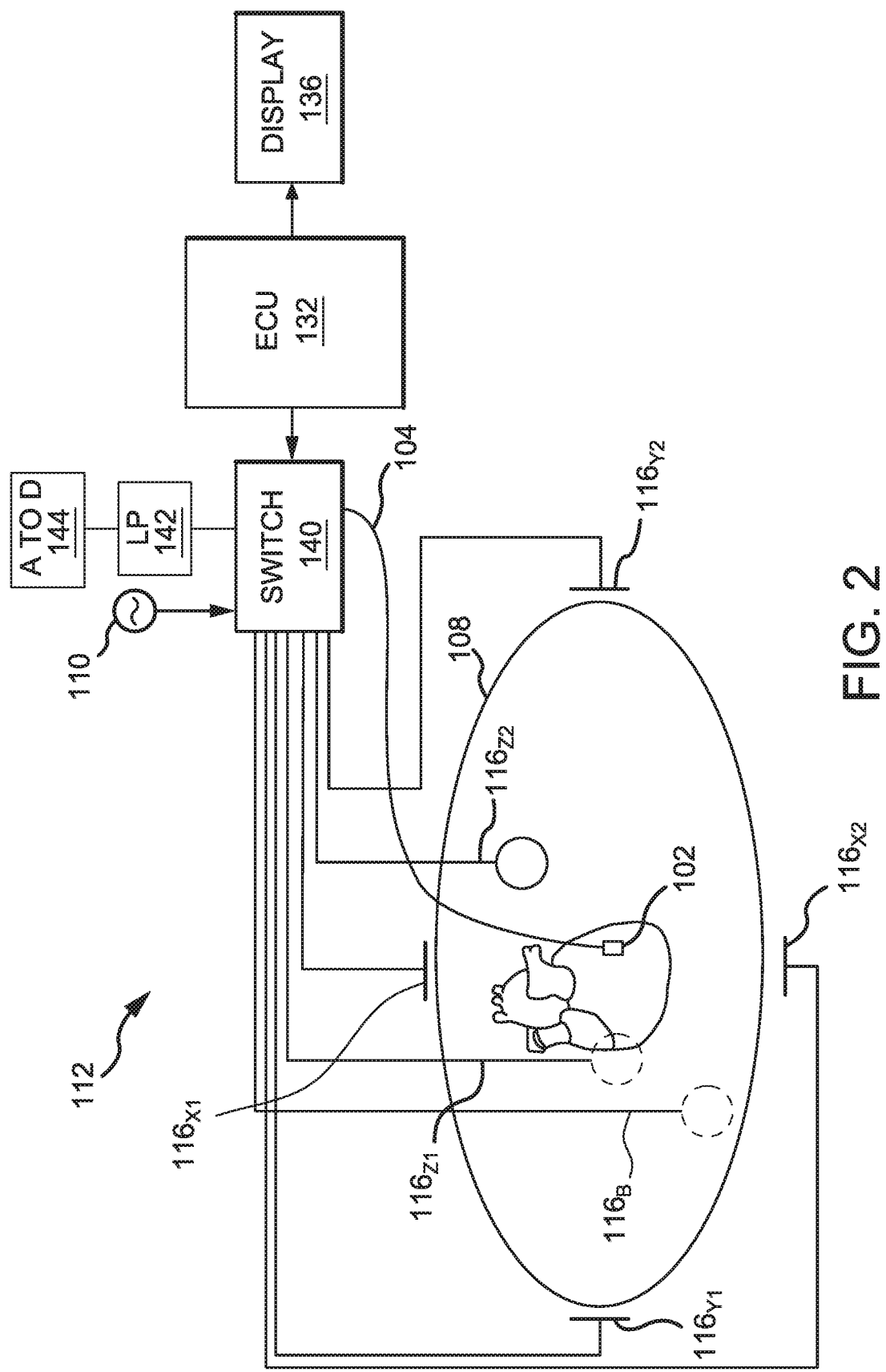
FIG. 2 is a simplified diagrammatic and schematic view of an exemplary visualization, navigation, and/or mapping system of the catheter system shown in FIG. 1.

With continued reference to FIGS. 1 and 2, visualization, navigation, and mapping system 112 may include a plurality of patch electrodes 116, ECU 132, and display device 136, among other components. With the exception of a patch electrode $116_B$ called a "belly patch," patch electrodes 116 are provided to generate electrical signals used, for example, in determining the position and orientation of catheter 104, and in the guidance thereof. In one embodiment, patch electrodes 116 are placed orthogonally on the surface of the patient's body 108 and are used to create axes-specific electric fields within the body 108. For instance, in one exemplary embodiment, patch electrodes $116_{X1}$, $116_{X2}$ may be placed along a first (x) axis. Patch electrodes $116_{Y1}$, $116_{Y2}$ may be placed along a second (y) axis, and patch electrodes $116_{Z1}$, $116_{Z2}$ may be placed along a third (z) axis. In other embodiments, the dipoles created may not be on an axis, for example, a dipole between electrodes $116_{X1}$ and $116_{Y1}$. Each of the patch electrodes 116 may be coupled to a multiplex switch 140. In an exemplary embodiment, ECU 132 is configured through appropriate software to provide control signals to switch 140 to thereby sequentially couple pairs of electrodes 116 to a signal generator (e.g., power supply 110). Excitation of each pair of electrodes 116 generates an electrical field within body 108 and within an area of interest such as the patient's heart. Voltage levels at non-excited electrodes 116, which are referenced to the belly patch $116_B$, are filtered by, for example, a low pass filter 142, converted by an analog-to-digital converter 144, and provided to ECU 132 for use as reference values.

As discussed above, catheter 104 includes electrode basket 102 coupled thereto. Electrode basket 102 includes one or more electrodes (e.g., electrodes 226, shown in FIGS. 3-5) mounted therein or thereon that, in some embodiments, are electrically connected to ECU 132 and that is/are configured to serve a position sensing function. In an exemplary embodiment, electrode basket 102 is placed within electrical fields created in the body 108 by exciting patch electrodes 116. When disposed within the electric fields, the electrodes on electrode basket 102 experience voltages that are dependent on their location between patch electrodes 116 and the position of each electrode relative to the tissue of the anatomic structure 106 being mapped. Voltage measurement comparisons made between each electrode on electrode basket 102 and patch electrodes 116 can be used to determine the position of each electrode on electrode basket 102 relative to the anatomic structure 106. This position information may then be used by ECU 132, for example, to generate models, such as surface models, and/or maps of, or corresponding to, anatomic structure 106, as is well known in the art. Accordingly, as catheter 104 is moved along the surface of a desired anatomic structure 106, for example, electrode basket 102 can be used to collect location data points that correspond to locations of the electrodes thereon, and therefore, the surface of anatomic structure 106. These location data points can then be used by ECU 132, for example, to generate or construct a surface model of anatomic structure 106. Further, information received from electrode basket 102 can also be used to display on a display device, such as display device 136, the location and orientation of electrode basket 102 and/or the tip of catheter 104. Accordingly, among other things, ECU 132 of visualization, navigation, and mapping system 112 provides a means for generating display signals used to control display device 136 and the creation of a graphical user interface (GUI) on display device 136.

ECU 132 may include, for example, a programmable microprocessor or microcontroller, or may comprise an application specific integrated circuit (ASIC). ECU 132 may include a central processing unit (CPU) and an input/output (I/O) interface through which ECU 132 may receive a plurality of input signals including, for example, signals generated by electrode basket 102. ECU 132 may also generate a plurality of output signals including, for example, those used to control display device 136. ECU 132 may be configured to perform various functions, such as those described herein, with appropriate programming instructions or code. Accordingly, in one embodiment, ECU 132 is programmed with one or more computer programs encoded on a computer-readable storage medium for performing the functionality described herein.

ECU 132 may be configured to construct a geometrical anatomical model of structure 106 for display on display device 136. ECU 132 may also be configured to generate a GUI through which a user may, among other things, view a geometrical anatomical model and/or control electrode basket 102. The anatomical model may include a 3-D model or a two-dimensional (2-D) model. To display the data and images that are produced by ECU 132, display device 136 may include one or more conventional computer monitors or other display devices well known in the art.

Figure 3:
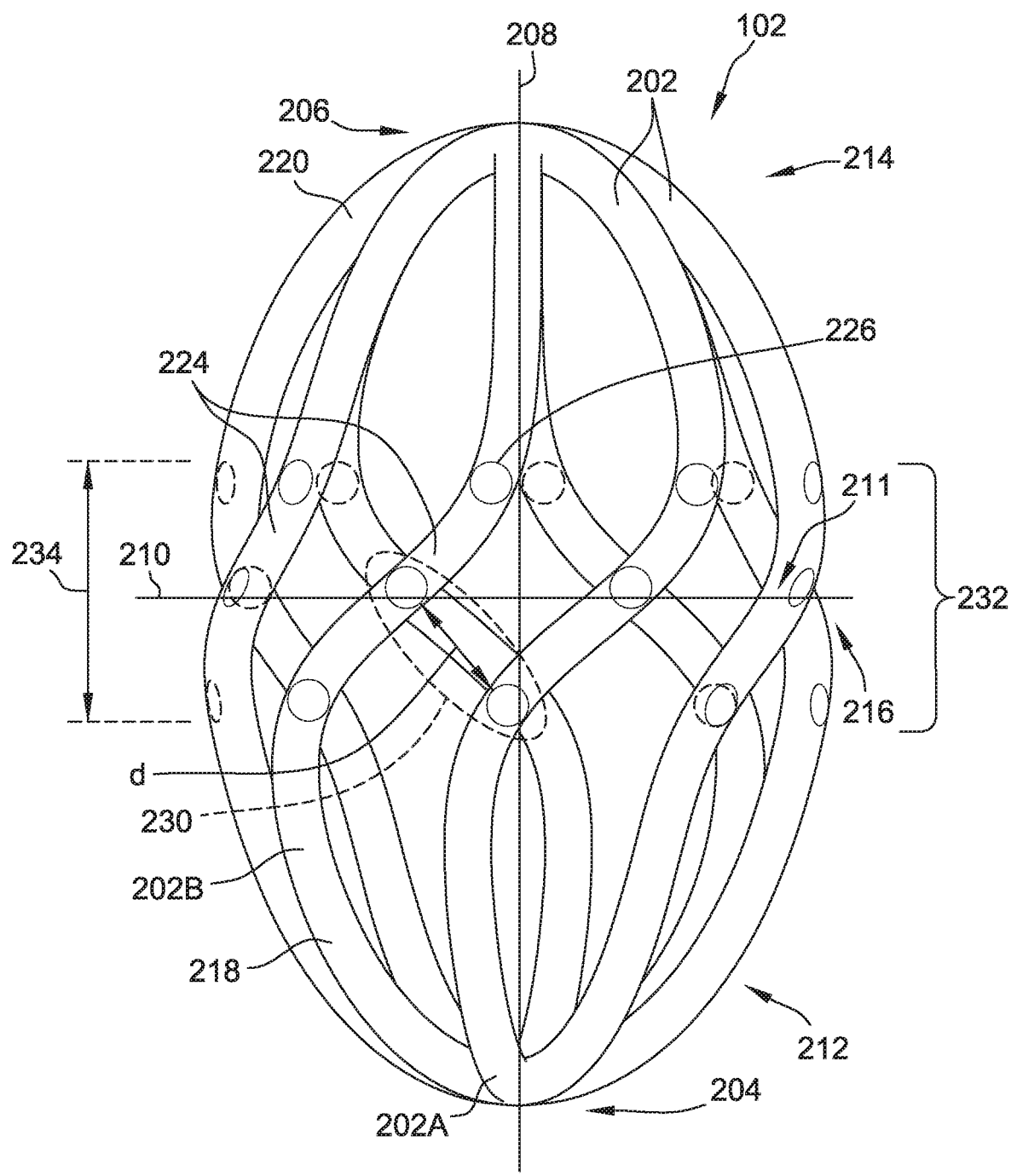
FIGS. 3-5 depict one example embodiment of an electrode basket suitable for use with the catheter system shown in FIG. 1.
Figure 4:
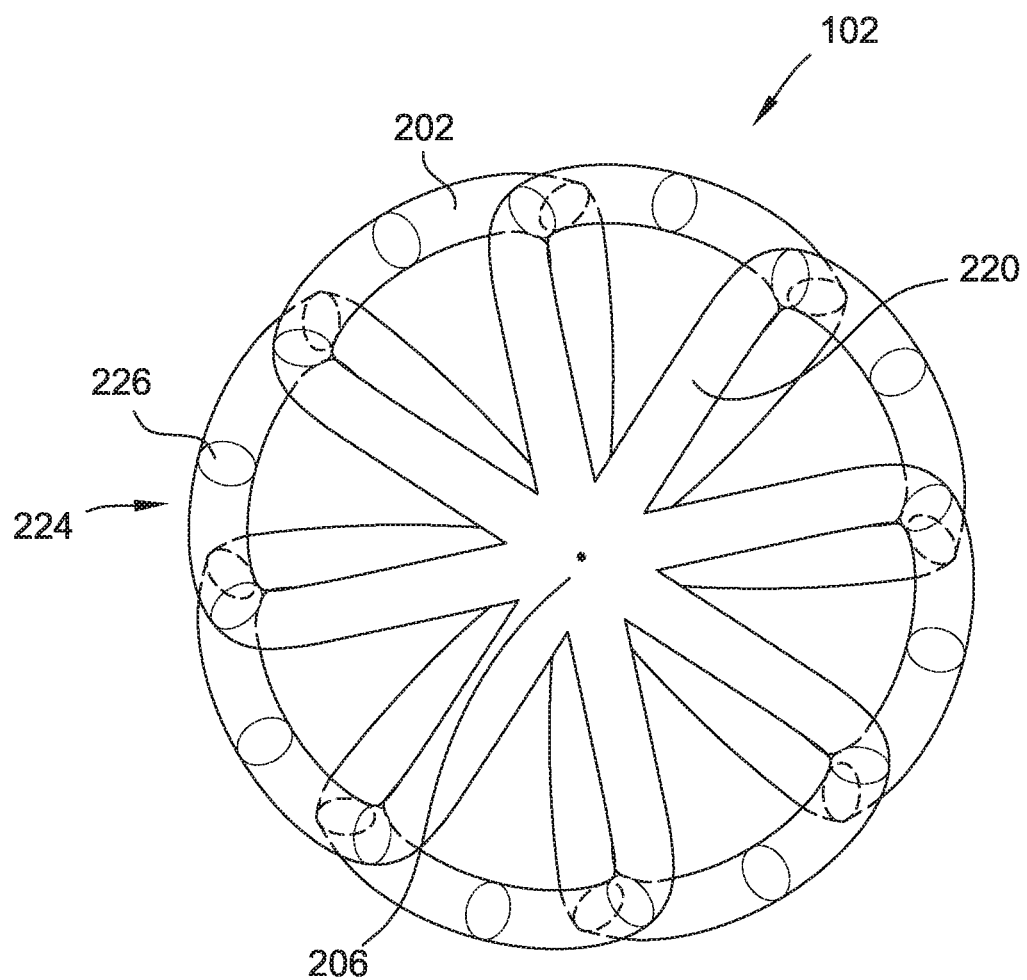
Figure 5:
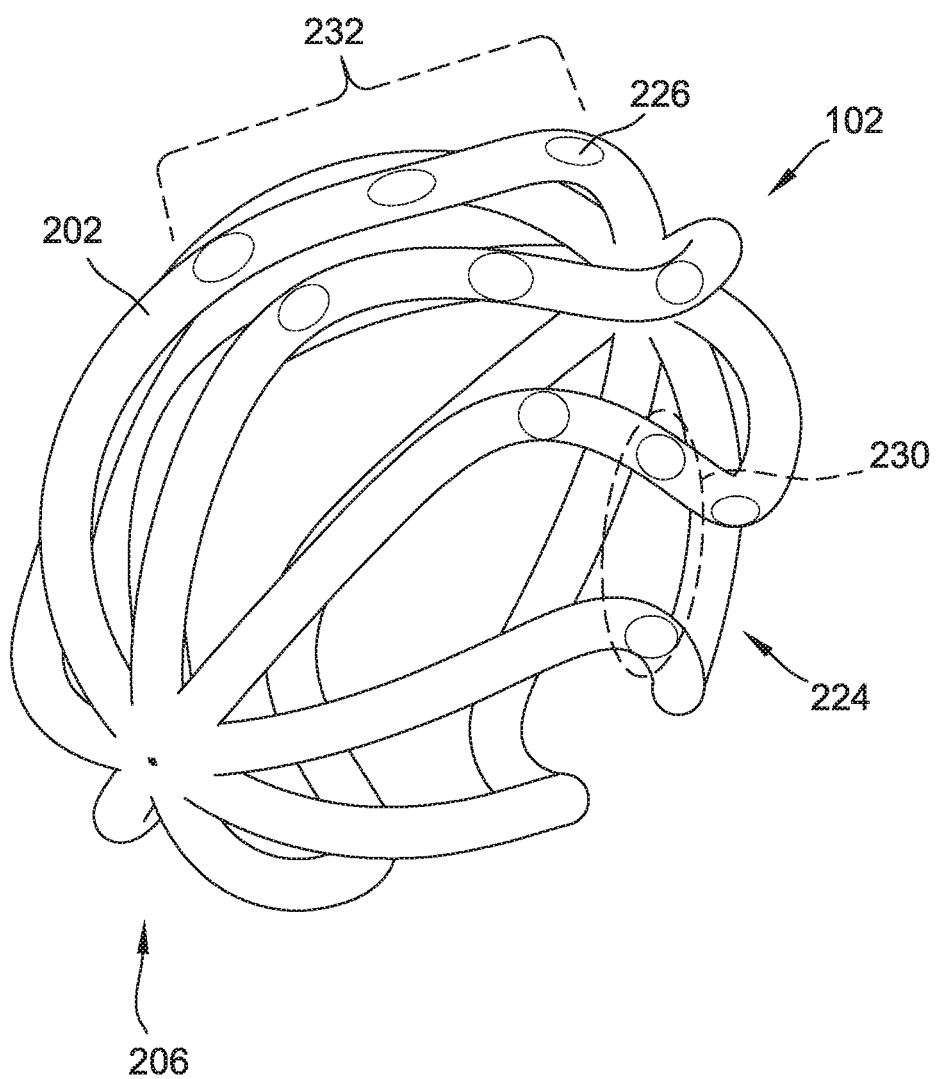

Referring now to FIGS. 3-5, there is shown an example electrode basket 200 in accordance with one embodiment of the present disclosure. Electrode basket 200 may be substantially similar to electrode basket 102, shown in FIG. 1. Electrode basket 200 includes a plurality of splines 202 extending between a proximal end 204 and a distal end 206 of electrode basket 200. Electrode basket 200 may include any suitable number of splines 202, such as 8 splines, or between 4 and 12 splines. In the illustrated embodiment, splines 202 are coupled together at proximal end 204 and distal end 206, such that electrode basket 200 is "closed" at both ends 204, 206 thereof.

Electrode basket 200 extends longitudinally along a longitudinal axis 208 and includes an axial or lateral midline or center 210. Longitudinal axis 208 extends through proximal end 204 and distal end 206. A proximal portion 212 of electrode basket 200 extends distally from proximal end 204 towards midline 210, and a distal portion 214 extends proximally from distal end 206 towards midline 210. A central or intermediate portion 216 of electrode basket 200 extends from proximal portion 212 to distal portion 214.

Each spline 202 also includes a respective proximal portion 218 extending at least partially longitudinally from proximal end 204 of electrode basket 200, a distal portion 220 extending at least partially longitudinally from distal end 206 of electrode basket 200, and a highly pitched region 224 extending between proximal portion 218 and distal portion 220. As used herein, the term "highly pitched region" refers to a region of a spline that is highly pitched with respect to adjacent regions of the spline and a longitudinal axis of the electrode basket (e.g., longitudinal axis 208)—i.e., the spline has a more circumferential orientation, or is oriented more circumferentially (or laterally/latitudinally) than adjacent regions of the spline. Generally, the highly pitched region of a spline may extend circumferentially about a longitudinal axis of the corresponding electrode basket such that the highly pitched region overlaps a highly pitched region of an adjacent spline, when viewed longitudinally from the distal end or proximal end of the electrode basket (as shown in FIG. 4).

Figure 6:
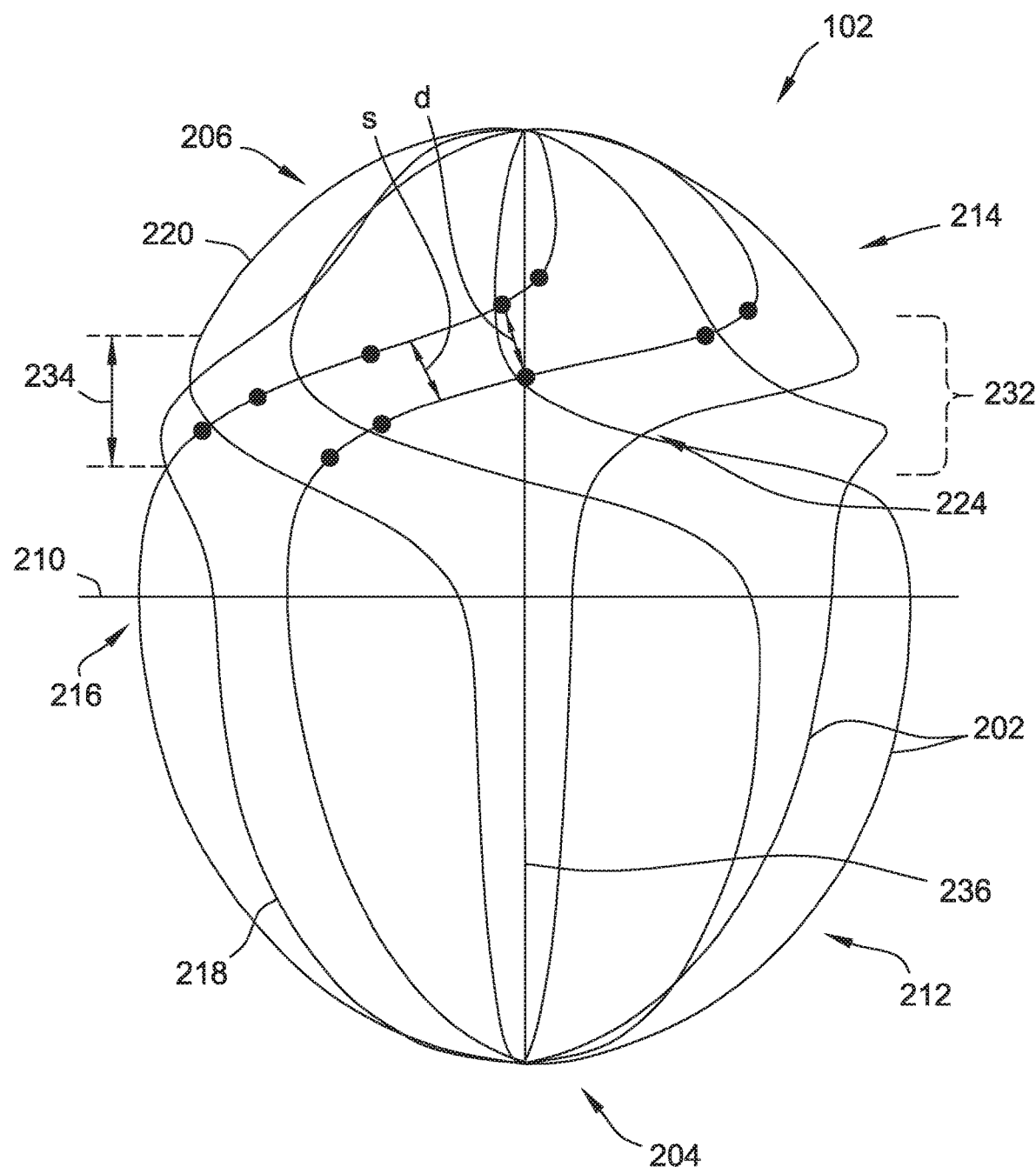
FIG. 6 depicts an alternative design for an electrode basket suitable for use with the catheter system shown in FIG. 1.

In the illustrated embodiment of FIGS. 3-5, highly pitched region 224 is located within intermediate portion 216 of electrode basket 200, and extends distally and proximally about midline 210. Further, highly pitched region 224 is reflectively symmetric about an obliquely oriented plane (not shown) that intersects a midpoint 211 of each spline 202 (corresponding to midline 210 of electrode basket 200). FIG. 6 depicts one alternative design of electrode basket 200 including splines 202 having a highly pitched region 224 located within distal portion 214 of electrode basket. Specifically, highly pitched region 224 is entirely distal of midline 210. In either embodiment, highly pitched region 224 is highly pitched relative to adjacent regions of spline 202. As best shown in FIG. 6, a distance s between adjacent splines 202 is reduced in highly pitched region 224, relative to splines without highly pitched region 224.

In the embodiments illustrated in FIGS. 3-6, the curve of each spline 202 and highly pitched region 224 can be described or defined with respect to spherical coordinates (r, θ, φ), where r represents a radial coordinate, θ represents an azimuthal angle, and φ represents a polar angle. In the exemplary embodiment, highly pitched region 224 is a region where the curvature of spline 202 has a high rate of change; specifically, the azimuthal angle θ varies non-linearly as the polar angle φ increases constantly. That is, a rate of change of the curvature along the azimuthal angle θ is non-constant with respect to a constant rate of change of the polar angle φ, within highly pitched region 224 of spline 202. In some embodiments, the specific curvature of spline 202 is defined by a function that relates the (non-constant) rate of change of the azimuthal angle θ and the (constant) rate of change of the polar angle φ (referred to generally as a rate of change of the curvature of spline 202). Highly pitched region 224 includes the portion of spline 202 at which the rate of change of the azimuthal angle θ with respect to the rate of change of the polar angle φ is highest (e.g., where $$\frac{d}{d\varphi}\theta(\varphi)$$

or the rate of change of the curvature of spline 202 is at a maximum).

Figure 9:
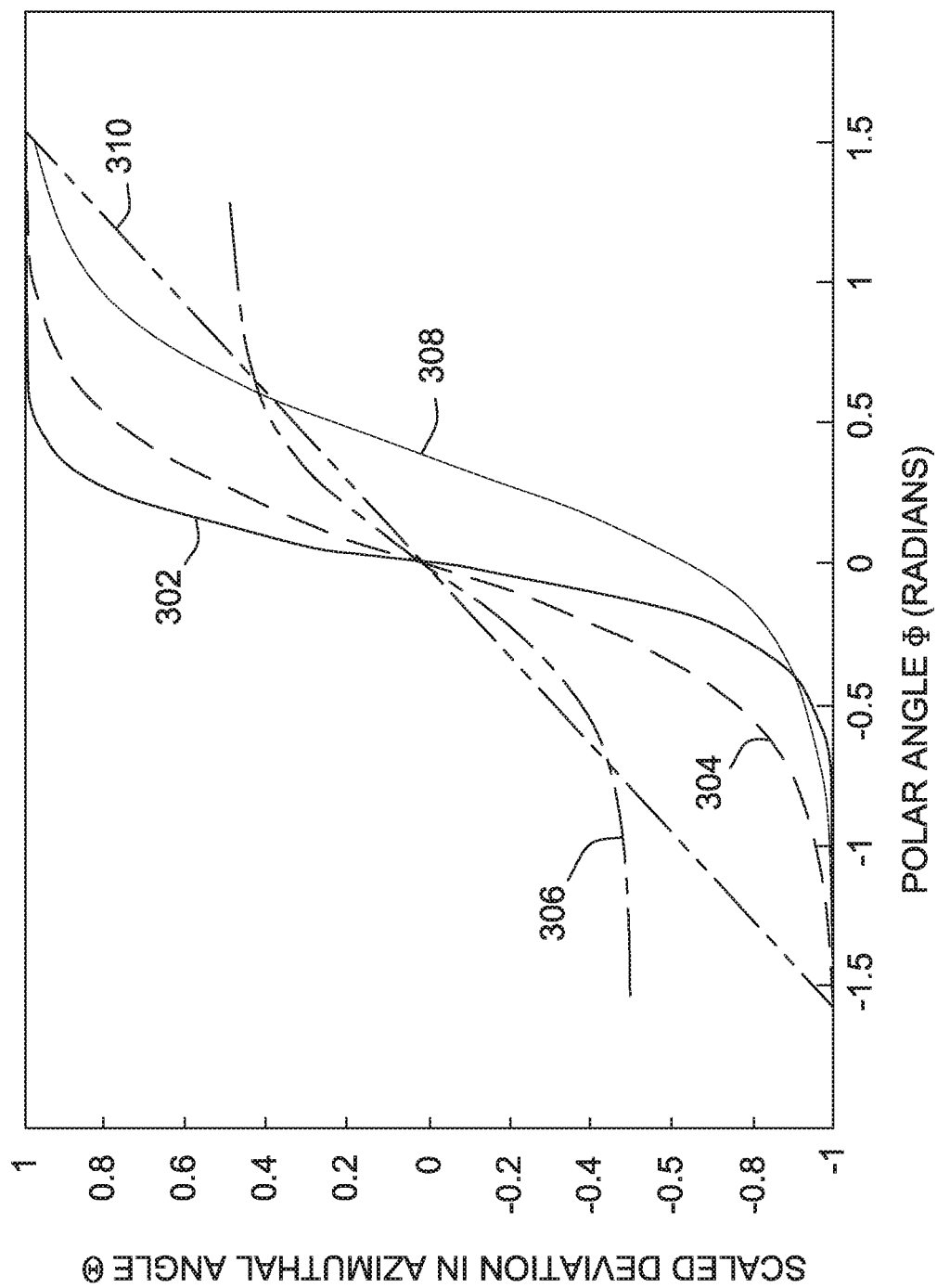
FIG. 9 is graph illustrating the relationship between a polar angle and an azimuthal angle of different spline curvatures suitable for use with the catheter system shown in FIG. 1.

Exemplary spline-curvature defining functions θ(φ) are illustrated in FIG. 9. Each of functions 302, 304, and 306 is associated with a spline curvature that is centered about midline 210 of electrode basket 200, featuring varying rates of change with respect to the polar angle φ. Function 308 is associated with a spline curvature featuring a highly pitched region distal of midline 210. The curvature of a spline is highest—that is, the spline is most pitched, or most circumferentially oriented with respect to the longitudinal axis—where the slope of the respective defining function is highest.

A function 310 is provided to illustrate the constant curvature of a helical spline (i.e., an x=y function). As described further herein, the non-constant curvature of splines 202 enables an increased electrode density over helical splines. For example, for an electrode basket having helical splines with constant curvatures, an electrode density near a centerline thereof is substantially similar to that of a typical (spherical or ellipsoidal) electrode basket. To achieve greater electrode density, a helical spline with constant curvature would need to wrap further around the electrode basket, increasing the length of each spline and reducing the axial strength of the electrode basket. Splines 202 having highly pitched region 224 as described herein achieve a higher electrode density without substantially increasing the length of the splines and without substantially decreasing an axial strength of electrode basket 200.

Returning to the embodiment shown in FIGS. 3-5, each spline 202 has the same curvature. Accordingly, each spline 202 includes highly pitched region 224 extending along a common axial length of electrode basket 200. Specifically, highly pitched region 224 is located along the same range of polar angle φ on each spline 202 and has the same axial or longitudinal length. In one or more alternative embodiments, at least one spline 202 may have a curvature that is different from that of adjacent splines 202, such as a highly pitched region 224 located at a different axial/longitudinal position along the spline 202, a spline 202 having a highly pitched region 224 of a different length, and/or a spline 202 having a highly pitched region 224 with a different rate of change of the azimuthal angle θ (with respect to a constant rate of change of the polar angle φ).

Additionally, splines 202 are coupled at proximal end 204 and distal end 206 at different angular or circumferential positions. Specifically, as best shown in FIG. 3, a first spline 202A originates at proximal end 204 at a first angular position, referred to for clarity as the origin or 0°. First spline 202A terminates at distal end 206 at a different angular position, approximately 50° from the origin. Likewise, each other spline 202 terminates at distal end 206 approximately 50° offset from its respective origin at proximal end 204. In other embodiments, each spline 202 may terminate at any other angular position with respect to its origin. In general, a higher amount of "pitch" (or greater circumferential orientation) and/or a greater length of the spline in the highly pitched region 224 will increase the angular deviation or offset of the termination of a spline from its origin.

In the exemplary embodiment, as shown in FIGS. 3-5, electrode basket 200 further includes a plurality of electrodes 226. Each spline 202 includes at two or more electrodes 226 thereon. In the embodiment illustrated in FIGS. 3-5, each spline 202 includes three electrodes 226, although each spline 202 may include any suitable number of electrodes 226, including, for example and without limitation, two electrodes, four electrodes, five electrodes, six electrodes, or more than six electrodes. Moreover, electrodes 226 are positioned along spline 202 within highly pitched region 224. In the illustrated embodiment, electrodes 226 are evenly spaced along the corresponding spline 202. In alternative embodiments, electrodes 226 may have any other spacing along a spline (regular, irregular, patterned, etc.). For example, in another embodiment, the spacing of electrodes 226 is proportional to a rate of change of the curvature of spline 202. In some embodiments, even spacing of electrodes 226 (e.g., as shown in FIGS. 3-5) may be implemented where electrode basket 200 is used to perform ablation or irreversible electroporation (IRE) procedures, and patterned spacing of electrodes 226 (e.g., as shown in FIG. 6; electrodes 226 are only shown on two splines 202, for clarity) may be implemented where electrode basket 200 is used to perform mapping procedures.

In the illustrated embodiment, each spline 202 is substantially similar, such that electrodes 226 are similarly positioned along a length of each spline 202. In one or more alternative embodiments, one or more splines 202 may have electrodes 226 arranged at different positions along a length thereof than an adjacent spline 202. For example, adjacent splines 202 may alternate between two, three, four, or more different patterns or arrangements of electrodes 226.

In general, for an electrode basket, closest electrode pairs (e.g., cathode-anode electrode pairs) are defined across adjacent splines. For example, a first electrode (e.g., a cathode) on a first spline will be closest to a second electrode (e.g., an anode) on a second, adjacent spline. The distance between these two electrodes in a closest electrode pair is referred to as d (see FIGS. 3 and 6).

As described herein, a typical electrode basket includes straight splines or splines with a regular curvature (e.g., splines without any portion that is pitched with respect to a longitudinal axis thereof). The distance d between electrodes in a closest electrode pair varies; specifically, the distance d increases near the midline of the electrode basket.

With respect to electrode basket 200 of the present disclosure, splines 202 include highly pitched region 224 with electrodes 226 located therein. The distance d between electrodes 226 in a closest electrode pair 230 (see FIG. 3) is substantially similar throughout the length of highly pitched region 224, even nearer to midline 210. Moreover, the distance d is less than that in typical electrode baskets. Specifically, the distance s between splines 202 in highly pitched region 224 is reduced compared to typical electrode baskets, and therefore the distance d between electrodes 226 in closest electrode pairs 230 (also referred to as an "inter-electrode spacing") is also reduced. Reduced inter-electrode spacing may be particularly desirable in mapping applications, in which electrode spacing is associated with mapping precision. Specifically, closer electrode pairs 230 may generate higher precision results, which is desirable in mapping small tissue features. Moreover, this reduced inter-electrode spacing is achieved without increasing the number of splines.

Notably, closest electrode pairs 230 need not be defined at the same longitudinal or axial position on adjacent splines 202. In the illustrated embodiment of FIGS. 3-5, for example, a closest electrode pair 230 (encircled by a dashed ellipse for clarity) includes electrodes 226 at different longitudinal positions on adjacent splines 202. Thus, in some embodiments, the inter-electrode spacing between closest electrode pairs 230 may be less than a circumferential distance between adjacent splines 202 (i.e., a distance between splines 202 taken along a latitude of electrode basket 200). In some embodiments, however, closest electrode pairs 230 may be defined at the same longitudinal position on adjacent splines 202.

Accordingly, electrode basket 200 includes a high-density circumferential band 232 of electrodes 226 defined around electrode basket 200, specifically in highly pitched region 224. The distance d between electrodes 226 in a closest electrode pair 230 is about 5 mm or less, and may be about 4 mm or less (which may be desirable for use in ablation procedures), or about 2 mm or less (which may be desirable for use in mapping procedures). In the exemplary embodiment, the distance d between electrodes 226 may be reduced further towards 0 mm as the pitch of splines 202 within highly pitched region 224 is increased (i.e., as highly pitched region 224 is made more circumferential or latitudinal). The distance d between electrodes 226 in a closest electrode pair 230—or inter-electrode spacing—is taken between an electrode on a first spline of splines 202 (e.g., first spline 202A) and an electrode on an adjacent second spline of splines 202 (e.g., a second spline 202B, shown in FIG. 3).

Band 232 of electrodes 226 is defined along an axial length 234 of electrode basket 200. Axial length 234 may correspond to the longitudinal length of highly pitched region 224. Alternatively, axial length 234 may be less than or greater than the longitudinal length of highly pitched region 224 without departing from the scope of the present disclosure.

Figure 7:
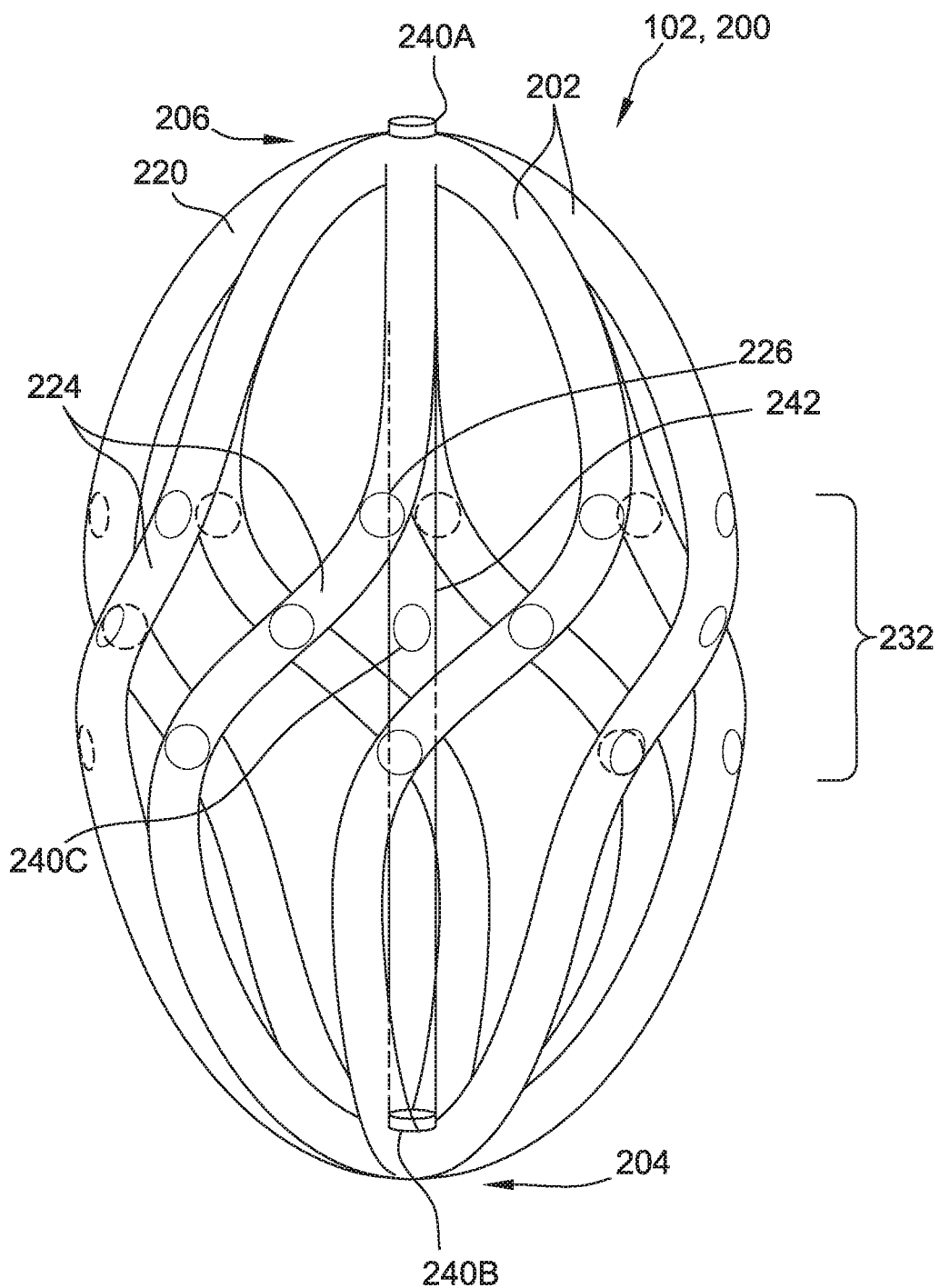
FIG. 7 depicts another design for an electrode basket suitable for use with the catheter system shown in FIG. 1, including one or more return electrodes.

In some embodiments, as shown in the embodiment of FIG. 7, electrode basket 200 further includes one or more return electrodes 240. In the illustrated embodiment, a first return electrode 240A is positioned at distal end 206 of electrode basket 200, a second return electrode 240B is positioned proximate to proximal end 204 of electrode basket 200, and a third return electrode 240C is positioned on a central spline 242 that extends longitudinally through electrode basket 200. In any embodiment, electrode basket 200 may include any one or any combination of return electrodes 240A, 240B, 240C.

In these embodiments, return electrode(s) 240A, 240B, 240C are electrically coupled to power supply 110. Electrodes 226 and return electrode(s) 240A, 240B, 240C are electrically controlled by power supply 110 to form "wide" bipoles for ablation therapies, as described elsewhere herein. More particularly, a respective bipole is formed between each electrode 226 and one of return electrodes 240A, 240B, 240C (that is, if more than one return electrode 240A, 240B, 240C is present, only one is activated at any one time). Relative to conventional electrode baskets, because electrodes 226 are densely packed in band 232, a circumferential ablation pattern may be more reliably formed.

Splines 202 may be formed from any suitable material that enables electrode basket 200 to function as described herein including, for example and without limitation, stainless steel, copper-aluminum-nickel alloys, nickel-titanium (NiTi) alloys, nitinol, alloys including zinc, copper, gold, and/or iron, polymers including any of the above materials, and/or combinations thereof. Splines 202 may have a cylindrical or substantially flat shape. In one specific embodiment of the present disclosure, splines 202 are formed from a memory-shape alloy, such as a nickel-titanium metal alloy. Such memory-shape alloys tend to have a temperature induced phase change that will cause the material to have a preferred configuration that can be fixed by heating the material above a certain transition temperature to induce a change in the phase of the material. When the alloy is cooled back down, the alloy will "recall" the shape it was in during the heat treatment and will tend to assume that configuration unless constrained from doing so. One particularly desirable memory shape alloy for use in the present disclosure is Nitinol, an approximately stoichiometric alloy of nickel and titanium, which may also include minor amounts of other metals to achieve desired properties. Nickel-titanium alloys are very elastic and are commonly referred to as "superelastic" or "pseudoelastic." In another embodiment, splines 202 are formed from a material such as a printed flexible circuit. The elasticity of these alloys enable electrode basket 200, formed from splines 202, to transition from a collapsed configuration (e.g., while being guided to a target location in a patient's body 108 using a catheter shaft 122, as shown in FIG. 1) to an expanded configuration for deployment inside of the patient's body 108.

Splines 202 may alternatively be formed from a polymeric material, such as polyamide tubing. In such embodiments, electrode basket 200 may include a pull and/or push wire 236 (shown in FIG. 6), which enables an operator to selectively transition electrode basket 200 between its collapsed and expanded configurations.

Electrodes 226 may be formed from any suitable material and may be coupled to splines 202. For example, electrodes 226 may be formed from a printed flexible circuit, which enables flexibility in electrode arrangement and placement, including co-linear and non-co-linear patterns along a length of splines 202. Alternatively, electrodes 226 may be integral to splines 202. For example, splines 202 may be formed from a conductive material and at least partially covered with an insulating material. Electrodes 226 may be defined along spline 202 in regions free of any insulating material.

Figure 8:
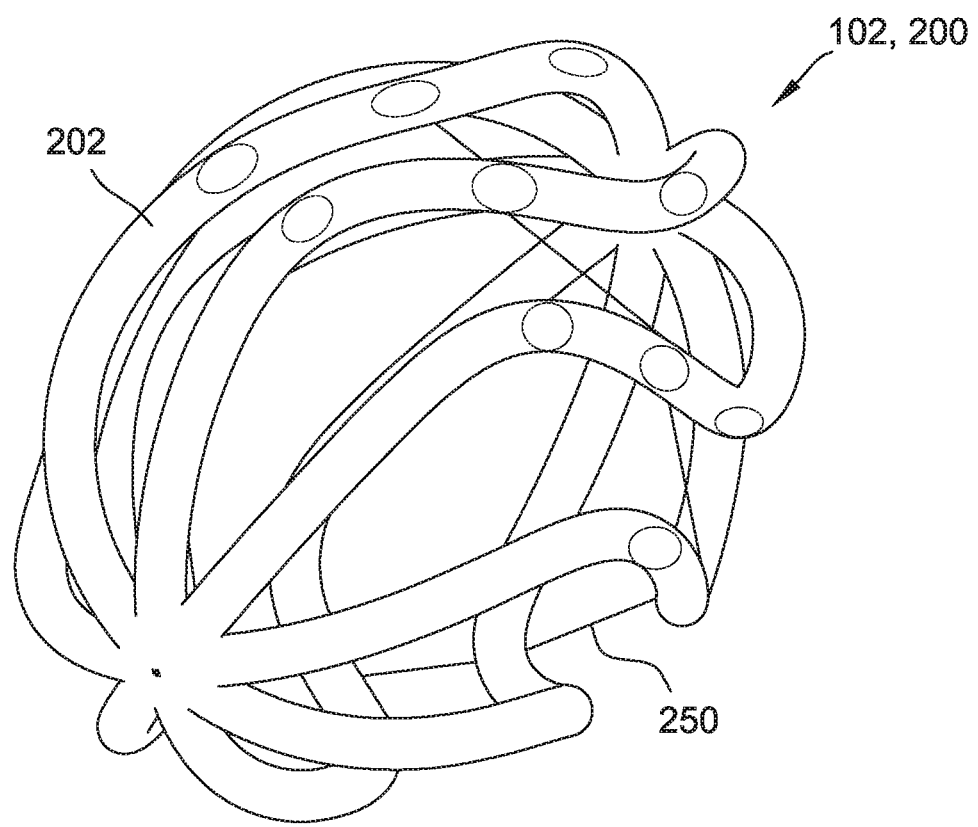
FIG. 8 depicts another design for an electrode basket suitable for use with the catheter system shown in FIG. 1, including a plurality of tethers.

In some embodiments, as shown in FIG. 8, electrode basket 200 further includes a plurality of tethers 250 (also referred to as "support members"). Each tether 250 is coupled between adjacent splines 202 of electrode basket 200. Tethers 250 limit displacement of splines 202 from one another, thereby preventing "splaying" or other undesirable movement between adjacent splines 202. Therefore, tethers 250 may facilitate keeping adjacent splines 202 at a more uniform distance from one another, which improves uniformity of the position of electrodes 226 positioned on splines. When used in a bipolar or monopolar power delivery (e.g., for ablation therapy, as described herein), uniformity of electrodes 226 mitigates gaps in the formed lesions. In the case of monopolar power delivery, tethers 250 facilitate keeping electrodes 226—and, thus, the formed lesions—sufficiently closely spaced. In the case of bipolar power delivery, when bipolar electrodes 226 are separated by greater distances, the field strength (~V/d) between electrodes of electrode pairs can decrease. By improving the uniformity of spline 202 and electrode 226 positioning, tethers 250 also improve the ability to create a uniform potential gradient. In the exemplary embodiment, tethers 250 are formed from a medical grade polymer monofilament, or any other suitable slender tensile element (e.g., thread or suture material).

Figure 10:
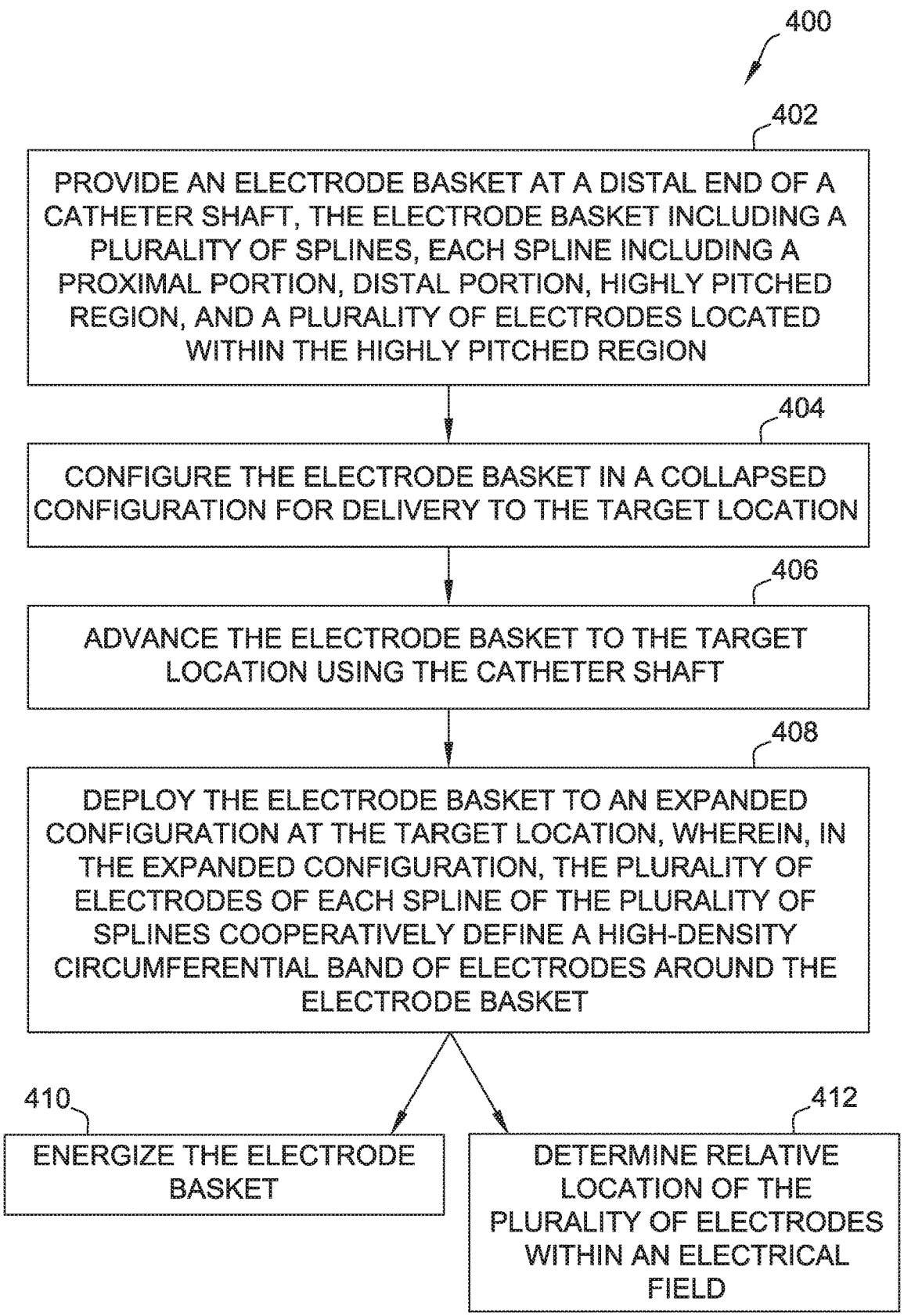
FIG. 10 is a flow diagram of a method for performing a medical procedure at a target location within a patient's body using an electrode basket.

FIG. 10 is a flow diagram of a method 400 for performing a medical procedure at a target location using an electrode basket (e.g., electrode basket 102, shown in FIG. 1, and/or electrode basket 200, shown in FIGS. 3-6). Method 400 includes providing 402 the electrode basket at a distal portion of a catheter shaft (e.g., catheter shaft 122, shown in FIG. 1). The electrode basket includes a plurality of splines (e.g., splines 202, shown in FIGS. 3-6) extending from a proximal end to a distal end of the electrode basket. Each spline includes a highly pitched region (e.g., highly pitched region 224, shown in FIG. 3). In the highly pitched region, the spline is oriented more circumferentially than in adjacent regions of the spline. Each spline includes a plurality of electrodes (e.g., electrodes 226, shown in FIGS. 3-6), where each of the plurality of electrodes is located within the highly pitched region.

Method 400 also includes configuring 404 the electrode basket in a collapsed configuration for delivery to the target location. Configuring 404 may include, for example, drawing the electrode basket proximally through a lumen of a catheter shaft and/or a guide tube (not shown). The electrode basket is forced into its elongated, collapsed configuration by the force of the walls of the catheter shaft and/or guide tube.

Method 400 further includes advancing 406 the electrode basket to the target location using the catheter shaft. As described herein, an operator (and/or an automated system) may manipulate a handle coupled to the catheter shaft to guide the catheter shaft and the electrode basket through a patient's vasculature to the target location.

In addition, method 400 includes deploying 408 the electrode basket in an expanded configuration at the target location. In the expanded configuration, the plurality of electrodes of each spline of the plurality of splines cooperatively define a high-density circumferential band of electrodes around the electrode basket. Deploying 408 may include advancing the electrode basket distally out of the lumen of the catheter shaft and/or the guide tube. In the exemplary embodiment, the electrode basket is at least partially formed from a shape memory material, and accordingly, the electrode basket naturally expands from the collapsed configuration to the expanded configuration, in the absence of any force thereon.

Method 400 also includes (i) energizing 410 the electrode basket to perform the medical procedure, and/or (ii) determining 412 relative locations of the plurality of electrodes on each spline within an electrical field generated across the target location to perform the medical procedure. Energizing 410 may include energizing the electrode basket to perform an ablation procedure, for example, using a power supply (e.g., power supply 110, shown in FIG. 1). Determining 412 may include generating the electrical field across the target location (e.g., the patient's body 108, shown in FIGS. 1 and 2) using a signal generator (e.g., power supply 110). In some embodiments, method 400 may include both energizing 410 and determining 412, for example, where a catheter system (e.g., catheter system 100, shown in FIG. 1) is used for both mapping and ablation procedures. In other embodiments, method 400 may include only one of energizing 410 and determining 412, for example, where the catheter system is used for only one of mapping or ablation procedures.

Although certain embodiments of this disclosure have been described above with a certain degree of particularity, those skilled in the art could make numerous alterations to the disclosed embodiments without departing from the spirit or scope of this disclosure. All directional references (e.g., upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the disclosure. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the disclosure as defined in the appended claims.

When introducing elements of the present disclosure or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions without departing from the scope of the disclosure, it is intended that all matter contained in the above description or shown in the accompanying drawings shall be interpreted as illustrative and not in a limiting sense.

What is claimed is:

1. An electrode basket for a catheter system, the electrode basket comprising:
   a proximal end;
   a distal end, wherein a longitudinal axis of the electrode basket extends longitudinally through the proximal end and the distal end; and
   a plurality of splines extending from the proximal end to the distal end, each spline including a proximal portion extending at least partially longitudinally from the proximal end, a distal portion extending at least partially longitudinally from the distal end, a highly pitched region extending between the proximal portion and the distal portion, and a plurality of electrodes, wherein the highly pitched region is oriented more circumferentially than the proximal portion and the distal portion, each of the plurality of electrodes located within the highly pitched region such that a high-density circumferential band of electrodes is defined around the electrode basket, and wherein the curvature of each spline defines a three-dimensional curve having spherical coordinates (r, θ, φ), wherein r represents a radial coordinate of a point on the curve, θ represents an azimuthal angle of the point on the curve, and φ represents a polar angle of the point on curve, wherein, in the highly pitched region, the azimuthal angle varies non-linearly as the polar angle increases at a constant rate of change.

2. The electrode basket of claim 1, wherein an inter-electrode spacing between a first electrode of the plurality of electrodes of a first spline of the plurality of splines and a second electrode of the plurality of electrodes of an adjacent spline of the plurality of splines is no more than 4 mm.

3. The electrode basket of claim 1, wherein an inter-electrode spacing between a first electrode of the plurality of electrodes of a first spline of the plurality of splines and a second electrode of the plurality of electrodes of an adjacent spline of the plurality of splines is no more than 2 mm.

4. The electrode basket of claim 1, wherein the electrode basket includes a distal portion that extends proximally from the distal end of the electrode basket toward a midline of the electrode basket, wherein the highly pitched region of each spline is located within the distal portion of the electrode basket.

5. The electrode basket of claim 1, wherein the highly pitched region of each spline is reflectively symmetric about an obliquely oriented plane that intersects a midpoint of each spline.

6. The electrode basket of claim 1, wherein the highly pitched region of each spline extends circumferentially around the longitudinal axis of the electrode basket such that the highly pitched region of each spline overlaps the highly pitched region of an adjacent spline when viewed longitudinally from one of the proximal end and the distal end.

7. The electrode basket of claim 1, wherein each of the plurality of electrodes is positioned on the respective spline where a rate of change of the azimuthal angle is greatest.

8. The electrode basket of claim 1, wherein the plurality of splines includes at least 8 splines.

9. The electrode basket of claim 1, wherein each of the plurality of splines has a same curvature.

10. The electrode basket of claim 1, further comprising a plurality of tethers, each tether coupled between a pair of adjacent splines of the plurality of splines to limit displacement of the pair of adjacent splines from each other.

11. The electrode basket of claim 1, further comprising a return electrode.

12. A catheter system comprising:
   a flexible catheter shaft;
   a handle coupled to a proximal end of the catheter shaft;
   an electrode basket sized for advancement through the catheter shaft to a distal end of the catheter shaft, the electrode basket comprising:
      a proximal end; and
      a distal end, wherein a longitudinal axis of the electrode basket extends longitudinally through the proximal end and the distal end; and
      a plurality of splines extending from the proximal end to the distal end, each spline including a proximal portion extending at least partially longitudinally from the proximal end, a distal portion extending at least partially longitudinally from the distal end, a highly pitched region extending between the proximal portion and the distal portion, and a plurality of electrodes, wherein the highly pitched region is oriented more circumferentially than the proximal portion and the distal portion, each of the plurality of electrodes located within the highly pitched region such that a high-density circumferential band of electrodes is defined around the electrode basket, and wherein the curvature of each spline defines a three-dimensional curve having spherical coordinates (r, θ, φ), wherein r represents a radial coordinate of a point on the curve, θ represents an azimuthal angle of the point on the curve, and φ represents a polar angle of the point on curve, wherein, in the highly pitched region, the azimuthal angle varies non-linearly as the polar angle increases at a constant rate of change.

13. The catheter system of claim 12, further comprising a power supply electrically coupled to the electrode basket and configured to energize the plurality of electrodes of each spline to perform an ablation function.

14. The catheter system of claim 13, wherein an inter-electrode spacing between a first electrode of the plurality of electrodes of a first spline of the plurality of splines and a second electrode of the plurality of electrodes of an adjacent spline of the plurality of splines is no more than 4 mm.

15. The catheter system of claim 12, further comprising:
a plurality of patch electrodes;
a signal generator electrically coupled to the plurality of patch electrodes and configured to selectively excite the plurality of patch electrodes to generate an electric field across a patient's body; and
an electronic control unit (ECU) configured to identify relative positions of the plurality of electrodes of each spline of the electrode basket within the patient's body to perform a mapping function.

16. The catheter system of claim 15 further comprising a display configured to display results of the mapping function.

17. The catheter system of claim 15, wherein an inter-electrode spacing between a first electrode of the plurality of electrodes of a first spline of the plurality of splines and a second electrode of the plurality of electrodes of an adjacent spline of the plurality of splines is no more than 2 mm.

18. The catheter system of claim 12, wherein the plurality of splines includes at least 8 splines.

19. A method of performing a medical procedure at a target location, the method comprising:

providing an electrode basket at a distal portion of a catheter shaft, the electrode basket including a plurality of splines extending from a proximal end to a distal end of the electrode basket, each spline including a proximal portion extending at least partially longitudinally from the proximal end, a distal portion extending at least partially longitudinally from the distal end, a highly pitched region extending between the proximal portion and the distal portion, and a plurality of electrodes, wherein the highly pitched region is oriented more circumferentially than the proximal portion and the distal portion, wherein each of the plurality of electrodes is located within the highly pitched region, and wherein the curvature of each spline defines a three-dimensional curve having spherical coordinates (r, θ, φ), wherein r represents a radial coordinate of a point on the curve, θ represents an azimuthal angle of the point on the curve, and φ represents a polar angle of the point on curve, wherein, in the highly pitched region, the azimuthal angle varies non-linearly as the polar angle increases at a constant rate of change;
configuring the electrode basket in a collapsed configuration for delivery to the target location;
advancing the electrode basket to the target location using the catheter shaft;
deploying the electrode basket to an expanded configuration at the target location, wherein, in the expanded configuration, the plurality of electrodes of each spline of the plurality of splines cooperatively define a high-density circumferential band of electrodes around the electrode basket; and
at least one of:
(i) energizing the electrode basket to perform the medical procedure; and
(ii) determining relative locations of the plurality of electrodes on each spline within an electrical field generated across the target location to perform the medical procedure.

20. The catheter system of claim 12, wherein each of the plurality of electrodes is positioned on the respective spline where a rate of change of the azimuthal angle is greatest.

* * * * *